United States Patent [19]

Brewer

[11] 4,063,700
[45] Dec. 20, 1977

[54] DOUBLE SADDLE HANGER CLAMP

[76] Inventor: Bill J. Brewer, 425 Devon Ave., Park Ridge, Ill. 60068

[21] Appl. No.: 666,108

[22] Filed: Mar. 11, 1976

[51] Int. Cl.² .......................... F16L 3/02; F16L 33/10
[52] U.S. Cl. ..................................... 248/62; 248/60; 24/277; 24/284; 285/199
[58] Field of Search ................... 24/277, 276, 135 M, 24/284; 248/60, 62; 285/199, 420

[56] References Cited

U.S. PATENT DOCUMENTS

| 473,537 | 4/1892 | Weidan | 24/284 |
|---|---|---|---|
| 3,040,407 | 6/1962 | Brown | 24/277 |
| 3,261,579 | 7/1966 | Engman | 248/60 |
| 3,292,887 | 12/1966 | Cassel | 248/60 |
| 3,336,056 | 8/1967 | Cassel | 285/420 |
| 3,604,676 | 9/1971 | Weber | 24/277 |
| 3,735,950 | 5/1973 | Paintin | 24/277 |

FOREIGN PATENT DOCUMENTS

| 1,028,176 | 5/1953 | France | 285/420 |
|---|---|---|---|
| 647,073 | 10/1962 | Italy | 24/135 M |

Primary Examiner—Bernard A. Gelak
Attorney, Agent, or Firm—Ladas, Parry, Von Gehr, Goldsmith & Deschamps

[57] ABSTRACT

A device for clamping tubular members such as an exhaust pipe with a muffler, wherein interengaging telescoped portions are clamped together by saddle members having semicircular portions adapted to apply circumferential pressure uniformly about the telescoped portions by means of a square U-bolt.

7 Claims, 4 Drawing Figures

DOUBLE SADDLE HANGER CLAMP

BACKGROUND OF THE INVENTION

1. Field of Invention

This invention is generally concerned with flexible hangers for supporting exhaust systems in vehicles. In particular, the invention comprises an improved hanger clamp for applying uniform compressive forces about the telescoped interengaged portions of an exhaust pipe and a muffler.

2. Description of the Prior Art

There are many known arrangements for supporting an exhaust system in a vehicle. Reference is made to some of the known arrangements as described in U.S. Pat. Nos. 2,981,351 - 3,161,252 - 3,270,992 and 3,292,887. As described in the last mentioned patent, namely U.S. Pat. No. 3,292,887, the hanger device comprises a conventional U-bolt cooperating with one saddle member for attaching an exhaust system to the frame of a vehicle. The U-bolt is installed with the threaded ends directed upwardly in order to facilitate rapid installation of the system on the vehicle chassis as it is moved along a conveyor line in an assembly plant. This installation is completed prior to the placing of the vehicle body atop the chassis.

As is well known, the exhaust system in the vehicle is subject to corrosive elements which precipitate deterioration of the exhaust system making it necessary to replace the muffler and its associated exhaust pipes such as the tailpipe. The replacement of the foregoing is exceedingly difficult because the U-bolt is generally corroded and furthermore insufficient space exists between the top of the muffler and the floor of the vehicle body for the insertion of manual or power tools. Even if the old U-bolt is removed by sawing or cutting with a torch, the replacement of the foregoing with a new U-bolt still presents a problem of installation in view of the insufficiency of working space above the muffler. As can be readily realized, the replacement of exhaust system components is difficult, time consuming and an expensive task.

The foregoing problem of replacing exhaust system components was solved to a certain extent by the patentee in U.S. Pat. No. 3,735,950, wherein a conventional U-bolt was used to secure the components by inverting the position of the U-bolt so that the legs of the U-bolt were directed downwardly, thereby permitting a workman to install the nuts on the ends of the U-bolt to secure the components of the exhaust system to the frame of the vehicle. The described hanger device, however, is not completely satisfactory inasmuch as the bight portion of the U-bolt is supported by a support member which presents an intervening or interferring portion preventing the bight portion of the U-bolt from applying uniform circumferential pressure on the top portion of the telescoped exhaust pipe and muffler connection. In other words, there is no uniform clamping about the total circumference of the telescoped portions of the components. Since such interference may prevent total circumferential sealing about the telescoped portions of the components, exhaust gases may leak out and find their way upwardly into the interior of the vehicle body.

SUMMARY OF THE INVENTION

It is therefore an object of this invention to provide an improved clamping arrangement about the telescoped portions of a pair of tubular members.

Another object of the invention is to provide an improved clamping arrangement by utilizing a pair of saddle hanger members having semi-circular portions or cut-outs which are adapted to compress telescoped portions of exhaust components.

Yet another object of the invention is to provide a pair of cooperating saddle hanger members which move toward each other to compress therebetween the telescoped portions of exhaust components, the saddle hanger members having body portions which are offset from each other so that extreme clamping forces can be achieved without interference between the body portions advancing toward each other during the application of the clamping force.

A still further object of the invention is to provide a clamp using a square U-bolt supporting a pair of saddle members each having a square U-shape with legs provided with semi-circular openings to support and clamp telescoped portions of tubular members.

In practicing this invention, a special U-bolt is used, wherein the bight portion of the U-bolt is not arcuate, as is generally known, but is substantially rectilinear and extends in generally perpendicular manner to the legs of the U-bolt. This special type of U-bolt is identified as a square U-bolt. The square U-bolt is inserted from above the hanger member attached to the frame of the vehicle into the two openings which are adapted to receive the conventional U-bolt during the assembly of the vehicle. This results in the square bight engaging the hanger member with the legs extending downwardly. Thereafter, an upper saddle member is inserted on the legs with the semi-circular cut-out being directed downwardly. Then, the telescoped portions of the exhaust components are placed within the cut-out and butted against the upper saddle member followed by a lower saddle member with an upwardly extending semi-circular cut-out forced under the telescoped portions. Thereafter, nuts are affixed on the threaded ends of the two legs of the square U-bolt and drawn tightly thereby compressing the two saddle members against the telescoped portions of the exhaust components. The openings or holes in the saddle members are un-symmetrically located, i.e., the holes are favored toward one of the two longitudinal sides of the member so that when the two saddle members are placed in proper position on the square U-bolt, the semi-circular cut-outs of the saddle members can advance towards each other and even pass each other without any interference. As a result, sufficient compressive forces can be applied to the telescoped portions to obtain a fairly uniform clamping about the telescoped portions of the exhaust components to obtain a substantial sealing between these telescoped portions even though initially large manufacturing tolerances may have existed between the dimensions of the exhaust pipe and the muffler connection outlet.

DESCRIPTION OF THE PREFERRED EMBODIMENT

Figure 1:
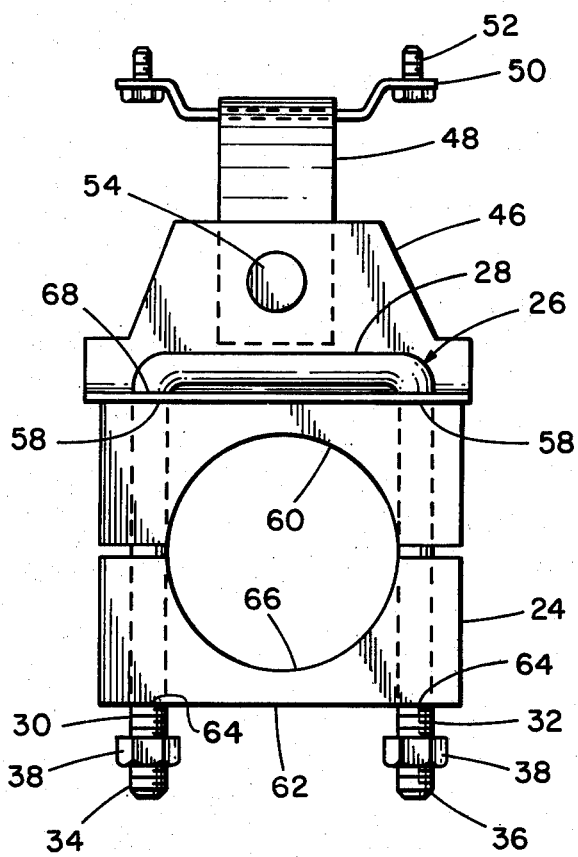
FIG. 1 is a view of a double saddle hanger clamp adapted to be suspended from the bottom of the frame of a vehicle.
Figure 2:
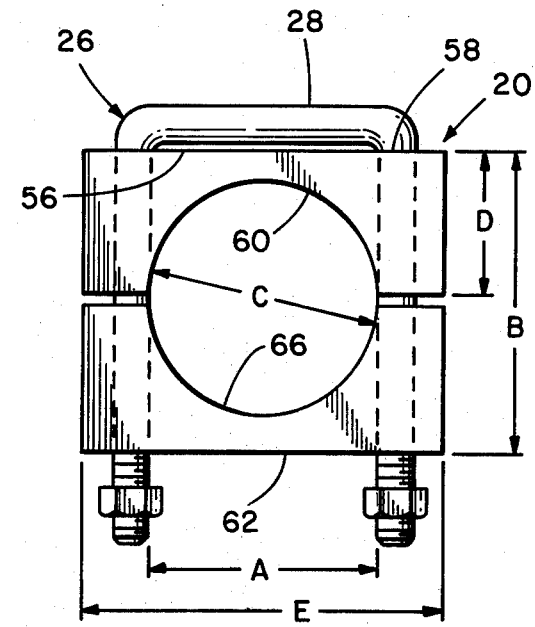
FIG. 2 is a front view of a double saddle hanger clamp.

Referring to FIGS. 1 and 2, a double saddle hanger clamp 20 comprises a pair of saddle members 22 and 24 adapted to be supported and drawn together by drawing means, such as a square U-bolt 26 having a bight 28 and a pair of extending legs 30 and 32 provided with threaded ends 34 and 36 for receiving fasteners such as nuts 38.

Figure 4:
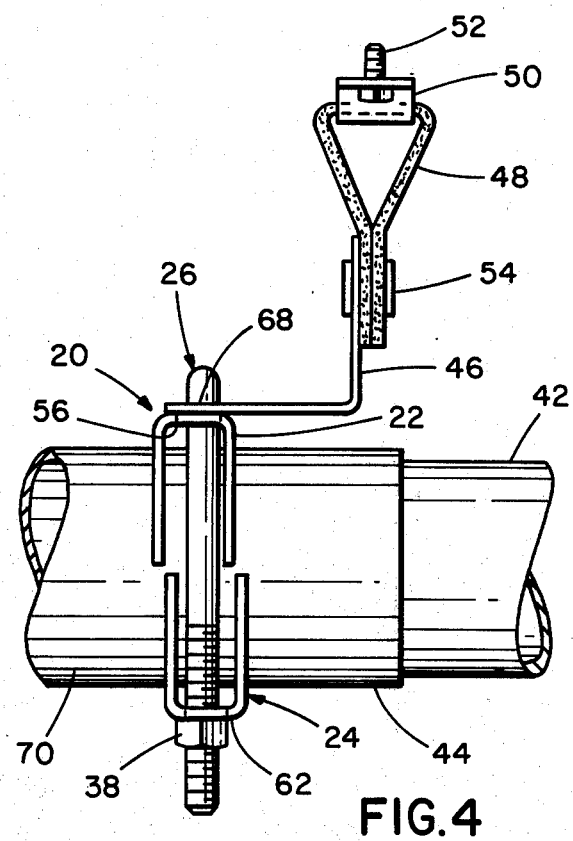
FIG. 4 is side view of a double saddle hanger clamp, as shown in FIG. 1, supporting telescoped portions of components in an exhaust system.

The double saddle hanger clamp 20 is adapted for supporting a piping arrangement including a pair of telescoped tubular members and is particularly useful in supporting an exhaust system in a vehicle. Referring particularly to FIGS. 1 and 4, a pair of telescoped portions of an exhaust system, such as a tailpipe 42 telescoped within a muffler outlet 44 is supported by the double saddle hanger clamp 20 attached to a bracket 46 flexibly supported by a loop member 48, generally made from a tire cord, suspended from a frame mounting bracket 50 which is adapted to be mounted on the frame (not shown) of a vehicle by means of bolts 52. The bracket 46 is attached to the loop member 48 with any fastener, such as a rivet 54.

Figure 3:
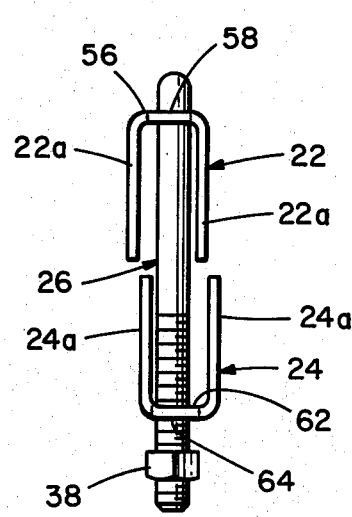
FIG. 3 is side view of the clamp shown in FIG. 2.

As best viewed in FIGS. 2 and 3, the saddle members 22 and 24 are made from a heavy sheet metal which is bent into a square U-shaped form, as shown in the side view in FIG. 3. In particular, the saddle member 22 has a bight 56 provided with a pair of openings 58 adapted for receiving the legs 30, 32 of the square U-bolt 26. Legs 22a of the U-shaped form are provided with a pair of semi-circular portions of cut-outs 60. Similarly, the U-shaped saddle member 24 has a bight 62 provided with a pair of openings 64 for receiving the legs 30, 32 of the square U-bolt 26. Legs 24a of the U-shaped form are provided with a pair of semi-circular portions or cut-outs 66.

As shown in FIG. 3, the openings 58 and 64 in the respective bights 56 and 62 are not symmetrically disposed in the saddle members. In other words, the openings 58 and 64 are disposed closer to one of the legs 22a, 24a, respectively, than the other legs, in order to provide an off-set so that the legs 22a and 24a of the respective saddle members 22 and 24 can pass each other without any interference when the nuts 38 are tightened to the limit of the threads on the ends 34, 36 of the square U-bolt 26.

The square U-bolt 26 is constructed by bending a metal rod, approximately 5/16 inches in diameter, so that legs 30, 32 extend at 90° angle with respect to the bight 28, the spacing between the legs being such that the legs can fit into the openings 58 and 64 in the respective saddle members 22 and 24. The threaded ends 34 and 36 may be formed by rolling or by cutting, however, it has been found that more force can be applied to the clamp by using a square U-bolt provided with cut threads.

Each saddle member, such as 22, is fabricated from a sheet of steel about ⅛ of an inch thick which is formed to possess a U-shape having a square bight. The holes 58 in the bight 56 are off-set by ⅛ of an inch from the longitudinal axis of the bight 56 so that the leg portions 22a, as previously explained, can advance toward similarly off-set leg portions 24a of the oppositely disposed saddle member 24 and pass each other without any interference. Openings 68 existing in the bracket 46 are of a size which is sufficient to accept the legs 30, 32 of the square U-bolt 26 and to accommodate the concave fillets existing on the inside corners of the bight junction with the legs 30, 32, so that, the bight 28 is in full contact with the portion of the bracket 46 extending between the openings 58.

After a vehicle is brought into a repair shop with a defective exhaust system, the exhaust system is removed from underneath the vehicle by using a torch to cut the conventional U-bolt or by mechanically dismantling the U-bolt of the hanger clamp. Then the defective portions of the exhaust system are replaced, and the replaced exhaust system is re-attached to the bottom of the frame of the vehicle.

Referring to FIG. 4, the outlet 44 of the muffler 70 telescopically receive one end of the tailpipe 42. The square U-bolt 26 is inserted from the top of the bracket 46 so that the legs 30 and 32 extend downwardly. The upper saddle member 22 is then slipped over the legs 30 and 32 until it abuts the bottom portion of the bracket 46. Thereafter, the telescoped connection of the muffler 70 and the tailpipe 42 are abutted against the semi-circular portions 60 of the saddle member 22. The lower saddle member 24 is then slipped over the legs 30 and 32 of the square U-bolt 26 so that the semi-circular portions 66 abut the muffler outlet 44. The saddle member 24 is inserted so that the semi-circular portions 66 are displaced with respect to the semi-circular portions 60 in the saddle member 22, so that the respective legs 22a and 24a are displaced with respect to each other as shown in FIG. 3.

Thereafter, the nuts 38 are screwed on manually or with a power tool to develop sufficient compressive force on the muffler outlet 44 to obtain a gas-tight interface connection between the muffler outlet 44 and the tailpipe 42.

In view of the large tolerances that exist during the manufacture of the muffler outlet 44 and the tailpipe 42, it is necessary that any hanger clamp that is used must have components which are capable of compressing the telescoped interconnection between the outlet 44 and the tailpipe 42. By using a pair of saddle members 22 and 24 provided with respective offset semi-circular portions 60 and 66, it is possible to draw up on the nuts 38 to force the saddle members toward each other to develop therebetween substantial compressive forces around the entire periphery of the muffler outlet 44 to obtain a gas-tight coupling between the muffler outlet 44 and the tailpipe 42. This is possible because the saddle members 22 and 24, as the nuts 38 are drawn up, do not possess any portions of construction which would interfere with the drawing up process. Furthermore, as best viewed in FIG. 1, the semi-circular portions 60, 66 define a completely round opening, there being no interfering support member within this opening to support the upper clamp 22, as was done previously with other known clamps.

It should be pointed out that tubular dimensions of the exhaust systems used in the various vehicles differ from each other. At present, there are three common types of exhaust systems, wherein the muffler outlet 44 tubular dimension is 1⅞ inches, 2 inches or 2½ inches in diameter. In order to obtain excellent gas-tight coupling between the muffler outlet and the tailpipe, it is preferable to use a double saddle hanger clamp which is specifically designed for the particular exhaust system.

Considering the three most common exhaust systems used in most of the vehicles today, the table herein below gives the preferred dimensions for the components of the double saddle hanger clamp together with the manufacturing tolerances.

| Dia. of muffler 44 | A | B | C | D | E |
|---|---|---|---|---|---|
| 1⅞ | 2.000 ± .010 | 3.625 ± .050 | 2.000 ± .020 | 1.250 ± .010 | 3.062 ± .020 |
| 2 | 2.125 ± .010 | 3.625 ± .050 | 2.125 ± .020 | 1.312 ± .010 | 3.125 ± .020 |
| 2¼ | 2.375 ± .010 | 3.500 ± .020 | 2.375 ± .020 | 1.375 ± .010 | 3.375 ± .020 |

(Above dimensions are in inches)

Although the present double saddle hanger clamp has been designed for the purpose of replacing the production type of clamp installed during the assembly of the new vehicle, it is quite apparent that the clamp described in this application can also be used as the part of original equipment during the assembly of the vehicle. Even though the vehicle manufacturer should use the inventive square U-bolt in an upward position, i.e., the ends of the square U-bolt being directed upwardly to facilitate the rapid assembly of the vehicle, it is clear that the advantages of better sealing between the components of the exhaust system are obtained.

As shown in FIG. 4, the nut 38 abuts the bight 62 of the saddle member 24, however, if preferred, an intervening flat or lock washer or both may be used to obtain a better securement of the double saddle hanger clamp 20 to the bracket 46.

As can be seen, a simplified exhaust system clamp has been provided using a minimum number of parts and providing effective compressive forces about the periphery of interengaging pipe connections to substantially eliminate exhaust fume leakage. The described clamp substantially reduces the amount of service work necessary to replace defective exhaust systems by using a pair of saddle members with a downwardly directed square U-bolt.

Since the leg portion 22a and 24a of the saddle members 22 and 24 are offset with respect to each other, the application of a force in drawing up on the nuts 38 will have a tendency to slightly deform the semi-circular portion 66 of the lower saddle member 24 against the underside of the muffler 70 providing a wrap-around effect about the lower half of the muffler. This deformation of the lower saddle member 24 about the lower half of the muffler provides a more uniform compressive force than is not normally possible with the known type of clamp which uses a conventional U-bolt with an arcuate bight installed to support the bottom portion of the muffler 70, at only one, the lowermost, point of suspension. Since the threaded ends of the conventional U-bolt pass through holes in the supporting bracket, the intervening portion of the bracket between the holes prevents the wrap-around effect that is achieved with the present invention.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a hanger means for supporting and clamping a telescoped connection of a muffler-tailpipe device under a vehicle frame, comprising an apertured bracket member supported from said vehicle frame, and means for clamping said muffler-tailpipe device to said apertured bracket member, the improvement wherein said clamping means comprise a U-bolt and a pair of saddle members supported by said U-bolt, each saddle member having a U-shape provided with a pair of legs joined by a bight, each leg having a semi-circular cut-out, said saddle member with said respective cut-outs defining therebetween a substantially circular opening for admitting said telescoped connection of said muffler-tailpipe device, said bight of each saddle member having a pair of openings adapted to receive said U-bolt, said saddle members being supported by said U-bolt with their respective legs facing each other but offset from each other.

2. A clamp for clamping together a pair of tubular members in telescoped relation about a common longitudinal axis, comprising a pair of generally U-shaped saddle members adapted to be disposed about the outermost of said tubular members for applying compressive forces to said outermost tubular members, each saddle member having leg portions extending away from a bight portion, the free end of each leg portion being formed with an arcuate surface adapted to abut and apply compressive forces to at least one-half of the periphery of said outermost tubular, the bight portion of each saddle member being formed with openings transversely spaced from said axis and adapted to receive securing means for drawing said saddle members toward each other and against said outermost tubular member, said securing means passing through said openings in both of said saddle members and supporting them with their respective leg portions offset from each other.

3. A clamp according to claim 2, wherein said securing means comprises a U-bolt having a bight abutting a substantial length of the bight portion of one of said saddle members, and a pair of threaded ends adapted to cooperate with said securing means for drawing said saddle members toward each other to apply compressive forces substantially about the entire periphery of said outermost tubular members.

4. A clamp according to claim 2, wherein each saddle member is made from a generally rectangular sheet that is bent into a U-shape, each of the leg portions so formed being cut out to provide an arcuate member for applying the compressive forces, the saddle members being disposed during assembly with said securing means with the leg portions of one saddle member facing toward the portions of the other saddle member but off-set therefrom to permit overlapping when drawn toward each other, the arcuate members defining therebetween a substantially circular opening for receiving and clamping said telescoped tubular members in a gas-tight relation.

5. A clamp according to claim 2, wherein each saddle member comprises a rectangular sheet having ends provided with said semi-circular portions, said sheet being formed into a U-shape having said leg portions connected by said bight, said pair of spaced openings in said bight portion being disposed closer to one of said leg portions than the other, said securing means comprising a U-bolt having a bight connecting a pair of legs having threaded ends for receiving fasteners, the legs of said U-bolt being adapted to clamp said saddle members about the outermost tubular member by passing through the openings in said saddle members.

6. In a hanger means according to claim 1, wherein said openings are circular and are offset from the longitudinal axis of said bight.

7. In a hanger means according to claim 1, wherein said U-bolt has a bight extending substantially across the bight in one of said saddle members.

* * * * *